United States Patent Office 2,909,643
Patented Oct. 20, 1959

2,909,643

SOLDER JOINT CONTAINING METALLIC PARTICLES

Herbert C. Graves, Jr., Pittsburgh, Pa., assignor to Gibson Electric Company, Pittsburgh, Pa., a corporation of Pennsylvania No Drawing. Application November 1, 1956
Serial No. 619,662

4 Claims. (Cl. 219—117)

The present invention relates to a novel solder joint, the method of preparing such a joint and solder and flux compositions used in such methods and joints. More particularly, it relates to a means by which a relatively thin solder joint of high tensile strength can be obtained and still more specifically, to a joint of this type which will have a high electrical conductivity and be suitable for the joining of electrical contacts to metallic supports.

The type of joint with which the present invention is concerned is that which is made when pressure and heat are applied to the parts to be joined. This is usually accomplished by means of well known carbon or resistance brazing techniques using brazing or welding machines. It has been previously determined that maximum joint strength may be obtained when solder thickness within the joint is relatively thin and is preferably less than .003 inch. In making such thin joints through the application of pressure and heat, it has been found that keeping the thickness of the joint relatively low by the movement of the two surfaces together will tend to squeeze out any air bubbles or other foreign substances as the pressure causes an outward flow of the melted solder which will scour the joint surface.

While the use of pressure has been advantageous in this respect it has been found that quite often the weight of moving parts of welding machines squeezes the members to be joined so close together that there is often not sufficient solder thickness between the two members to effect a proper joint.

Moreover, in making silver solder joints of this type, it is the usual technique to make sure that the parts to be joined are cleaned and then coated with a suitable flux which prevents oxidation of the parts during the heat cycle. Such fluxes, however, are electrical insulators when dry and tend to cause insulation or "black outs" in the soldering or brazing operation in which an electrical current is passed between the parts to be joined.

Accordingly, it is an object of the present invention to provide a solder joint which is relatively thin, of high tensile strength but which is not subject to disadvantages heretofore encountered in techniques wherein such joints were made.

Another object of the present invention is to provide a novel powdered solder composition which may be placed between the surfaces to be joined and which will assure a strong thin solder joint which can be made by the usual soldering or brazing techniques.

Still another object is to provide a novel flux composition which will maintain cleanliness of the surfaces of the parts to be joined and which will not be subject to hardening into a totally non-conducting mass, thereby causing "black outs" during the process of forming the solder joint.

Still another object of the present invention is to provide a method for making a thin, strong, highly conductive solder joint which may be used to join an electrical contact to a metallic supporting arm.

These and other objects of the present invention will become apparent from the following description.

In accordance with the present invention, a solder joint is provided in which there is included between the surfaces to be joined, a finely divided metallic powder. The powder is such that it is present in the form of finely divided discrete particles which are solder attracting. Suitable metallic powders are those from the group consisting of iron, cobalt and nickel.

These metallic powders may be inserted into the joint by mixing the same either with powdered solder or with the flux which is used to keep the surfaces clean.

The fluxes are usually made in paste form and include a powder which is mixed with water. Upon heating during the joining operation, the electrical current will drive off the water and often leave a non-conductive, black layer on the surfaces to be joined. With the metallic particles in the flux, however, it will continue to remain conductive even though the water from the flux mixture may be driven off.

The metallic particles may be mixed with any of the fluxes well known to the prior art. An example of such flux would be one of the following weight compositions:

25 percent potassium tetraborate
35 percent boric acid
40 percent potassium acid fluoride These components are mixed with sufficient water to have a pasty consistency. Another such flux known as "black flux" includes the above composition and in addition thereto, five percent elemental boron.

The metallic powders herein contemplated may also be added to the solder which is inserted between the surfaces to be joined and most readily when powdered solders are used. Of course, the metallic particles may also be included in solder-flux mixtures when it is found suitable to use such compositions.

In another embodiment, the surface to be joined could be solder-flushed and the nickel or other suitable metallic powder included therewith as a part of the flushing.

In any of the above methods, the metallic particles would be in the joint so as to maintain proper separation between the parts to be joined. Since optimum tensile strength usually decreases in a joint thickness greater than .003 inch it is desirable that the metallic powders generally be smaller than .003 inch diameter and preferably in the range of .001 to .002 inch, although in some instances they may be slightly larger than the joint thickness as they have some tendency to dig into the metals being joined. As a specific example, I have found that nickel powders that will go through a 200 mesh sieve and having a particle size of about .0012 inch are particularly satisfactory in making the solder joint of the present invention.

The metallic powder which I prefer to use is nickel powder, although as previously mentioned, iron and cobalt powders may also be used. The nickel or other powder will be effective if used in the solder or flux in amounts of from 1 to 5 percent. It has been found, however, that the amount of metallic powder may range from the least useful amounts (about 0.5 percent) up to relatively large amounts wherein there is still sufficient solder remaining to make a secure joint. The iron, cobalt and nickel powders are particularly suitable since they have an attraction for silver solders. They also assure an electrically conductive path between the two surfaces to be joined by the soldering or brazing operation, thus avoiding the effect of "blackouts." The iron, cobalt and nickel powders herein contemplated are also highly desirable in that they are unmelted by the soldering temperatures.

The type of silver-containing solders herein referred to are the well known compositions used for low temperature brazing. They go under such trade names as "Easy- Flo" (15½ percent copper, 50 percent silver, 16½ percent zinc and 18 percent cadmium and "BT" Solder (72 percent silver, 28 percent copper). These solders are primarily low melting silver alloys.

In accordance wtih the present invention, it is now possible to provide a joint thickness of .003 and even less than .0015 inch having a relatively high tensile strength since the possibility of squeezing out all the solder from the joint during the brazing operation is no longer present as the nickel particles in the joint will not only tend to attract solder particles, but will tend to hold the two surfaces apart when pressure is applied. The fact that the nickel or other particles have an attraction for silver solder causes them to build up solder surface coatings which form individual attachments between the bonded surfaces at each metallic particle. Moreover, the presence of the particles tend to prevent voids in the weld and the scouring action of the particles on being displaced will tend to dispel flux infusions and other contaminants. The nickel, cobalt or iron particles further embed themselves in both surfaces at the temperatures involved, thereby facilitating the bonding operation.

These metals are substatnialy unaffected by the soldering or brazing temperature, and essentially retain their particle charcteristics rather than becoming dissolved in or alloyed with the other solder components.

The inclusion of these metallic particles in the solder joints finds particular application in the joining of electrical contacts to metallic supporting arms. Specifically, I have found that silver-tungsten contacts may be readily joined to steel supporting arms by including in the joint finely divided nickel particles.

In joining silver-tungsten contacts to steel arms by means of conventional brazing appartus in which heat and pressure are applied to the surfaces to be joined and an electrical current passed therethrough, repeated operations with solder and flux mixtures containing 1 percent of 200 mesh finely divided nickel powder virtually eliminated any "blackouts" during the brazing operation. The solder thickness in the joints obtained were about .0015 inch and had a tensile strength somewhat in excess of 100,000 pounds per square inch.

In the specific example herein referred to, the nickel particles were first incorporated with the "Handy Flux" having the composition hereinabove referred to. The experiment was also performed by mixing a similar quantity of nickel particles (1 percent) with a low-melting silver alloy "BT" solder powder.

Further data showed that 2 percent of nickel powder produced equally satisfactory results and in fact that the nickel powder can range from the least useful amounts depending on the size and thickness of the desired joint up to as high as 50 percent.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. In combination, an electrical contact and a conductive metallic supporting arm, said contact and arm being rigidly secured together by a high-tensile strength solder joint of a thickness not greater than .003 inch, said joint having included therein, finely divided powders from the group consisting of iron, cobalt, and nickel, said powders being in their original unalloyed and unreacted state and having a particle size in the range of .001 to .002 inch diameter and being present in an amount of from 1 to 5 percent by weight of the solder in the said joint.

2. In combination, a silver-tungsten electrical contact and a steel supporting arm, said contact and arm being rigidly secured together by a solder joint of a thickness not greater than .003 inch, said joint having included therein, nickel powder sufficiently fine to pass through a 200 mesh sieve, said nickel powder being in its original unalloyed and unreacted state and being present in amount of from 1 to 5 percent by weight of the solder in the said joint, thereby producing a joint free of voids and having a tensile strength of at least 100,000 pounds per square inch.

3. The method of bonding an electrical contact to a metallic electrically conductive supporting arm comprising applying between the surfaces to be joined, a flux and a solder, said solder having included therewith up to 50 percent of discrete finely divided particles less than .003 inch in diameter from the group consisting of iron, cobalt and nickel, passing an electrical current through the surfaces to be joined and thereby obtaining a joint of high tensile strength free of voids and of a thickness less than .003 inch, the said particles essentially retaining their original chemical characteristics throughout the soldering operation.

4. The method of attaching a silver-tungsten electrical contact to a steel supporting arm comprising coating at least one of the surfaces to be joined with a solder having included therein up to 1 to 5 percent by weight of finely divided discrete nickel particles, between .001 and .002 inch in diameter passing electrical current between the contact and supporting arm and thereby obtaining a joint free from voids and unsoldered areas, less than .003 inch thick and having a tensile strength of at least 100,000 pounds per square inch, the said nickel particles essentially retaining their original chemical characteristics throughout the soldering operation.

References Cited in the file of this patent
UNITED STATES PATENTS

| Number | Name | Date |
|---|---|---|
| 1,155,426 | Liebmann et al. | Oct. 5, 1915 |
| 1,651,662 | Balke | Dec. 6, 1927 |
| 1,660,805 | Maineau | Feb. 28, 1928 |
| 2,012,443 | Coe | Aug. 27, 1935 |
| 2,060,959 | Terry | Nov. 17, 1936 |
| 2,151,758 | Gier | Mar. 28, 1939 |
| 2,301,915 | Harrington | Nov. 17, 1942 |
| 2,451,099 | La Motte | Oct. 12, 1948 |
| 2,606,362 | Martin et al. | Aug. 12, 1952 |
| 2,621,303 | Law | Dec. 9, 1952 |
| 2,714,760 | Boan et al. | Aug. 9, 1955 |
| 2,741,932 | Whitney et al. | Apr. 17, 1956 |